United States Patent
Lee et al.

(10) Patent No.: US 12,229,932 B2
(45) Date of Patent: Feb. 18, 2025

(54) DEFECT IMAGE GENERATION METHOD FOR DEEP LEARNING AND SYSTEM THEREFOR

(71) Applicant: DOOSAN ENERBILITY CO., LTD, Changwon (KR)

(72) Inventors: Jung Min Lee, Seoul (KR); Jung Moon Kim, Seongnam (KR)

(73) Assignee: DOOSAN ENERBILITY CO., LTD., Changwon (KR)

( * ) Notice: Subject to any disclaimer, the term of this patent is extended or adjusted under 35 U.S.C. 154(b) by 439 days.

(21) Appl. No.: 17/476,555

(22) Filed: Sep. 16, 2021

(65) Prior Publication Data

US 2022/0122244 A1 Apr. 21, 2022

(30) Foreign Application Priority Data

Oct. 20, 2020 (KR) ........................ 10-2020-0135737

(51) Int. Cl.
*G06T 3/00* (2024.01)
*G06T 5/40* (2006.01)
(Continued)

(52) U.S. Cl.
CPC .............. *G06T 7/0004* (2013.01); *G06T 3/00* (2013.01); *G06T 5/40* (2013.01); *G06T 5/50* (2013.01);
(Continued)

(58) Field of Classification Search
CPC ........... G06T 7/0004; G06T 3/00; G06T 5/40; G06T 5/50; G06T 5/70; G06T 11/00; G06T 2207/20081; G06T 2207/20192; G06T 2207/20221; G06T 2207/30108; G06T 7/0002; G06T 2207/20084; G06N 3/044; G06N 3/045; G06N 3/047; G06N 3/08
See application file for complete search history.

(56) References Cited

U.S. PATENT DOCUMENTS

2003/0149947 A1* 8/2003 Sarig ..................... G06T 7/0006
                                                      382/144
2016/0171664 A1* 6/2016 Komiya ................... G06T 5/50
                                                      382/275
(Continued)

FOREIGN PATENT DOCUMENTS

CN    109767419 A    5/2019
CN    110675359 A    1/2020
(Continued)

OTHER PUBLICATIONS

A survey on Image Data Augmentation for Deep Learning; Shorten and Khoshgoftaar J Big Data, (2019) 6:60, https:/ /doi.org/10.1186/s40537-019-0197-0 (Year: 2019).*
(Continued)

*Primary Examiner* — Ross Varndell
*Assistant Examiner* — Dustin Bilodeau
(74) *Attorney, Agent, or Firm* — Harvest IP Law, LLP (57) ABSTRACT

A method of generating a defect image for deep learning and a system therefor are provided. The method and the system are intended to be used in generating training data for an artificial intelligence algorithm. More specifically, the training data are defect images required to train an algorithm that identifies a defect from a product.

13 Claims, 6 Drawing Sheets

(51) Int. Cl.
  *G06T 5/50*  (2006.01)
  *G06T 5/70*  (2024.01)
  *G06T 7/00*  (2017.01)
  *G06T 11/00* (2006.01)

(52) U.S. Cl.
  CPC ............. *G06T 5/70* (2024.01); *G06T 11/00* (2013.01); *G06T 2207/20081* (2013.01); *G06T 2207/20192* (2013.01); *G06T 2207/20221* (2013.01)

(56) References Cited

U.S. PATENT DOCUMENTS

| | | | | |
|---|---|---|---|---|
| 2016/0269615 | A1* | 9/2016 | Deng | H04N 23/635 |
| 2017/0116498 | A1* | 4/2017 | Raveane | G06V 10/454 |
| 2018/0107896 | A1 | 4/2018 | Sagong | |
| 2021/0385337 | A1* | 12/2021 | Takayama | H04N 1/00045 |
| 2022/0114801 | A1* | 4/2022 | Xu | G06T 7/0012 |
| 2022/0207731 | A1* | 6/2022 | Johnston | G06T 7/0012 |
| 2023/0143738 | A1* | 5/2023 | Kim | G06T 11/60 382/141 |

FOREIGN PATENT DOCUMENTS

| | | |
|---|---|---|
| CN | 110853035 A | 2/2020 |
| CN | 110930470 A | 3/2020 |
| CN | 111524100 A | 8/2020 |
| CN | 111681162 A | 9/2020 |
| JP | 2005156334 A | 6/2005 |
| JP | 2017175523 A | 9/2017 |
| JP | 2020027424 A | 2/2020 |
| JP | 2020038227 A | 3/2020 |
| KR | 1020140014448 A | 2/2014 |
| KR | 1020180072020 A | 6/2018 |
| KR | 1020200033822 A | 3/2020 |
| KR | 1020200061478 A | 6/2020 |
| WO | 2019117065 A1 | 6/2019 |

OTHER PUBLICATIONS

Anselm Haselhoff et al.; Markov Random Field for Image Synthesis with an Application to Traffic [SJ Sign Recognition; 2017 IEEE Intelligent Vehicles Symposium (IV) Jun. 11-14, 2017, Redondo Beach, CA, USA (Year: 2017).*
Searched Report: Anselm Haselhoff et al.; Markov Random Field for Image Synthesis with an Application to Traffic Sign Recognition; 2017 IEEE Intelligent Vehicles Symposium (IV) Jun. 11-14, 2017, Redondo Beach, CA, USA.
Survey Paper: Connor Shorten and Tag hi M. Khoshgoftaar; A survey on Image Data Augmentation for Deep Learning; Shorten and Khoshgoftaar J Big Data, (2019) 6:60, https:/ /doi.org/10.1186/ s40537-019-0197-0.
EESR dated Mar. 23, 2022.
CN OA, dated May 9, 2024.

* cited by examiner

DEFECT IMAGE GENERATION METHOD FOR DEEP LEARNING AND SYSTEM THEREFOR

CROSS REFERENCE TO RELATED APPLICATION

This application claims priority to Korean Patent Application No. 10-2020-0135737, filed on Oct. 20, 2020, the disclosure of which is incorporated herein by this reference in its entirety.

FIELD

Methods and apparatuses consistent with exemplary embodiments relate to generating a defect image for deep learning and a system therefor. Particularly, the invention relates to generating a defect image for training an artificial intelligence algorithm to identify a defect in an inspection image.

BACKGROUND

There are several methodologies for identifying whether a defect exists in a product. A representative method for identifying the existence of a defect is to acquire an image of a product and analyze the acquired image.

Recently, artificial intelligence algorithms have been widely used for data analysis tasks, particularly, for an analysis requiring a lot of computation with big amounts of data. An artificial intelligence algorithm may be used to detect defections. It is expected that if the artificial intelligence algorithm was appropriately trained, the accuracy of defect detection of the artificial intelligence algorithm would be as effective as human intellectual judgement.

In order to enhance the accuracy of the artificial intelligence algorithm, an appropriate training needs to be preceded. In general, various types and huge volume of training data are required for an appropriate training. However, it is not easy to generate or collect such training data in practice.

In related art, common image augmentation methods were used for producing training data, such as, rotating, flipping, rescaling, resizing, shearing, zooming, and adding a noise. However, such methods create only a simple transformation of a defect (fault) image. They are limited in creating a new form of defect (fault) images that can be supplied to the artificial intelligence algorithm.

Accordingly, the demand for producing training data enabling the artificial intelligence algorithm to be sufficiently trained has been gradually increased. In particular, it is required to produce training image data that allow to detect various types and shapes of defects in a product. The present disclosure is proposed in view of the circumstances.

The description presented herein is to solve the technical problems mentioned above as well as to provide additional technical elements that are not easily invented by those skilled in the art.

BRIEF DESCRIPTION

The present disclosure is directed to generating various types of defect images for training and, furthermore, to quickly generating many defect images.

In addition, this invention is directed to enhancing the accuracy of detecting a defect in an inspection image by training an artificial intelligence algorithm with the generated defect images.

It is to be understood that technical problems to be solved by the present disclosure are not limited to the aforementioned technical problems, and additional aspects will be set forth in part in the description which follows and, in part, will become apparent from the description.

According to an embodiment of the present disclosure, there is provided a method of generating a defect image for training, the method including: extracting a defect area from a sample image; determining a target area in a base image, the target area being an area with which the defect area is to be synthesized; correcting the defect area by referring to image data of the target area; and generating the defect image for training by synthesizing the corrected defect area with the target area in the base image.

In addition, the method of generating the defect image for learning may further include, after the extracting of the defect area, transforming a shape of a defect in the defect area.

In addition, in the method of generating the defect image for learning, the determining the target area in the base image comprises using the shape of the transformed defect and a surrounding area around the transformed defect. Herein, either or both of a position and a size of the target area in the base image is randomly determined.

In addition, in the method of generating the defect image for learning, a correction for reducing a difference in image data between a surrounding area in the defect area and a surrounding area in the target area is made.

In addition, in the method of generating the defect image for learning, a histogram correction of either or both of the surrounding area in the defect area and the surrounding area in the target area is made.

In addition, in the method of generating the defect image for learning, the generating of the defect image for training by synthesizing the corrected defect area with the target area in the target image comprises performing an image adjustment on the defect area.

In addition, in the method of generating the defect image for learning, the performing of the image adjustment comprises performing a blur operation on an edge of either or both of a defect and a surrounding area of the defect.

According to another embodiment of the present disclosure, there is provided a method of generating a defect image for training, the method including: extracting a defect area from a sample image; transforming a shape of the defect area; and generating the defect image for training by synthesizing the defect area with a base image.

In addition, in the method of generating the defect image for learning, the generating of the defect image for training comprises inserting the transformed defect area to a target area where the position of the target area is determined at random.

In addition, in the method of generating the defect image for learning, the generating of the defect image for training comprises performing an image adjustment on the defect area after the defect area is inserted to the target area.

According to still another embodiment of the present disclosure, there is provided a system for generating a defect image for learning, the system including: an extraction component extracting a defect area from a sample image; a target area determination component determining a target area in a base image, the target area being an area with which the defect area is to be synthesized; a correction component correcting the defect area by referring to image data of the target area; and a synthesis component generating the defect image for training by synthesizing the corrected defect area with the target area in the base image.

In addition, the system for generating the defect image for learning may further include a transformation component transforming a shape of a defect in the defect area.

According to the present disclosure, various types of defect images for training can be quickly and easily generated to provide a sufficient amount of training data.

In addition, according to the present disclosure, the various types of defect images enable a sufficient training of the artificial intelligence algorithm which results in an enhanced accuracy of detecting a defect.

Effects that may be obtained from the present disclosure are not limited to the aforementioned effects. Other effects which are not described herein will be clearly understood by those skilled in the art from the following description.

DETAILED DESCRIPTION

Various modifications and various embodiments will be described in detail with reference to the accompanying drawings so that those skilled in the art can easily carry out the disclosure.

It should be understood, however, that the various embodiments are not for limiting the scope of the disclosure to the specific embodiment, but they should be interpreted to include all modifications, equivalents, and alternatives of the embodiments included within the spirit and scope disclosed herein.

In addition, although one or more functional blocks of the present disclosure are expressed as individual blocks, one or more of the functional blocks of the present disclosure may be a combination of various hardware and software components executing the same function.

The expression "including elements" is an open-ended expression which merely refers to existence of the elements, and it should not be construed as excluding additional elements.

It should be understood that when an element is referred to as being "coupled to" or "connected" to another element, it can be directly coupled or connected to the other element or intervening elements may be present therebetween.

Hereinafter, a method of generating a defect image for training and a system therefor will be described.

Figure 1:
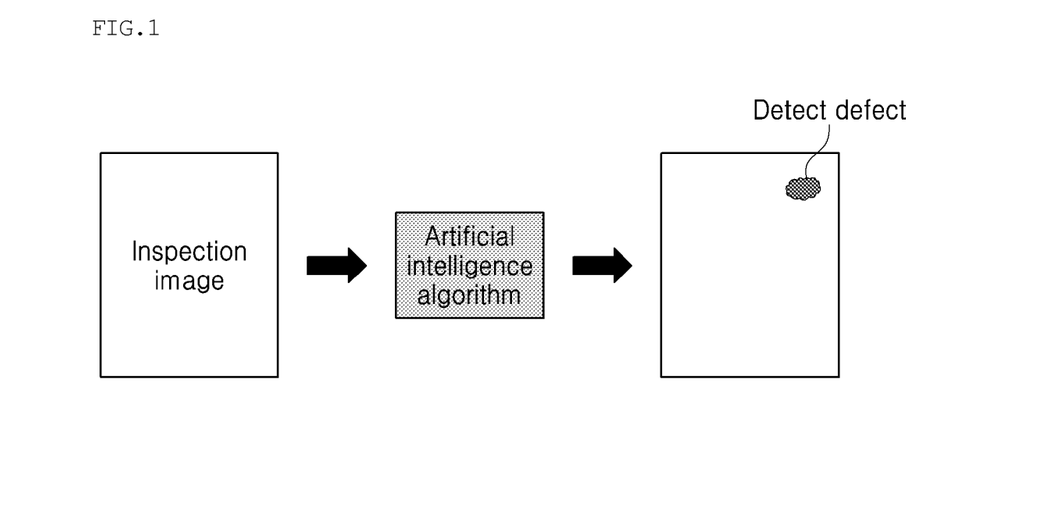
FIGS. 1 and 2 are diagrams illustrating a function and the reason for training an artificial intelligence algorithm described in the present disclosure.

FIG. 1 briefly describes detecting a defect using an artificial intelligence algorithm according to an exemplary embodiment. The artificial intelligence algorithm is supplied with an image for inspection, determines whether a defect exists in the image, and detects a defect area.

The image for inspection means image data generated by photographing a product. Herein, there is no particular limit on the product to be observed. The artificial intelligence algorithm in the present disclosure may be understood as a kind of non-destructive inspection. For example, a defect may be detected by performing an image analysis on a transmission image, such as an X-ray image. As long as the input to the artificial intelligence algorithm has the form of any image data, the artificial intelligence algorithm is able to identify and detect a defect.

The aforementioned artificial intelligence algorithm may be executed by a device having a central processing unit (CPU) and a memory. Herein, there is a premise that the artificial intelligence algorithm is implemented to enable machine learning, more precisely, deep learning.

Figure 2:
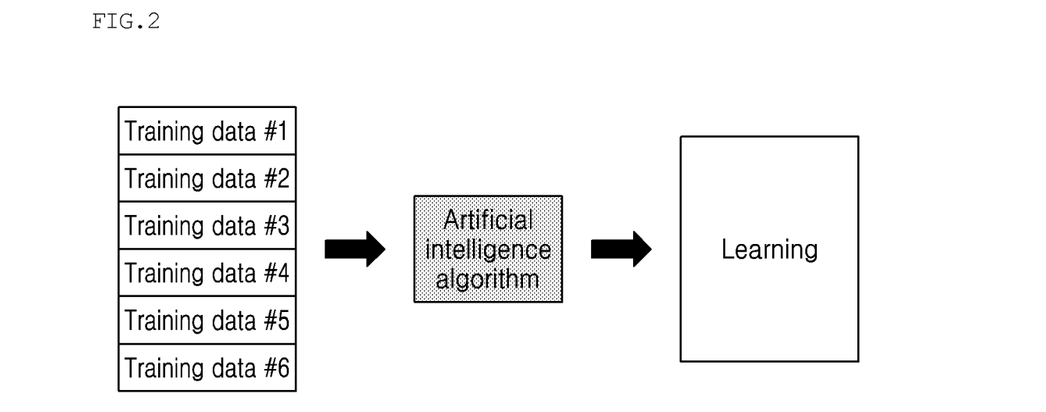

FIG. 2 is a diagram conceptually illustrating a process of training an artificial intelligence algorithm with multiple training images to enhance the performance of a model. Deep learning can be defined as a machine learning technique that teaches computers to learn by example, and it can be used predict y from x when there is no discernible relationship between x and y. There are various types of deep learning methods. A method of building a model by stacking neural networks in multiple layers is understood as deep learning. Representative deep learning models include a deep neural network, a convolutional neural network, a recurrent neural network, and a restricted Boltzmann machine. In the deep neural network, multiple hidden layers exist between an input layer and an output layer. The convolutional neural network forms the connectivity pattern between neurons which resembles the organization of animal visual cortex. The recurrent neural network builds up a neural network every moment over time. The restricted Boltzmann machine may learn a probability distribution over sets of inputs.

The artificial intelligence algorithms capable of such deep learning basically go through a process of training because it is difficult for the artificial intelligence algorithms to learn causality on their own without any information given at first. The learning process requires a lot of computation with big amounts of data. In general, computing power can be scaled up as needed, but there is a limit on the amount of training data that humans can provide. Insufficient number of training data greatly reduces the performance of the artificial intelligence algorithms. This invention is intended to be used to produce various types and an enormous amount of training data for an artificial intelligence algorithm. To put it simply, the present disclosure relates to a method and a system for generating training data shown on the left in FIG. 2.

Figure 3:
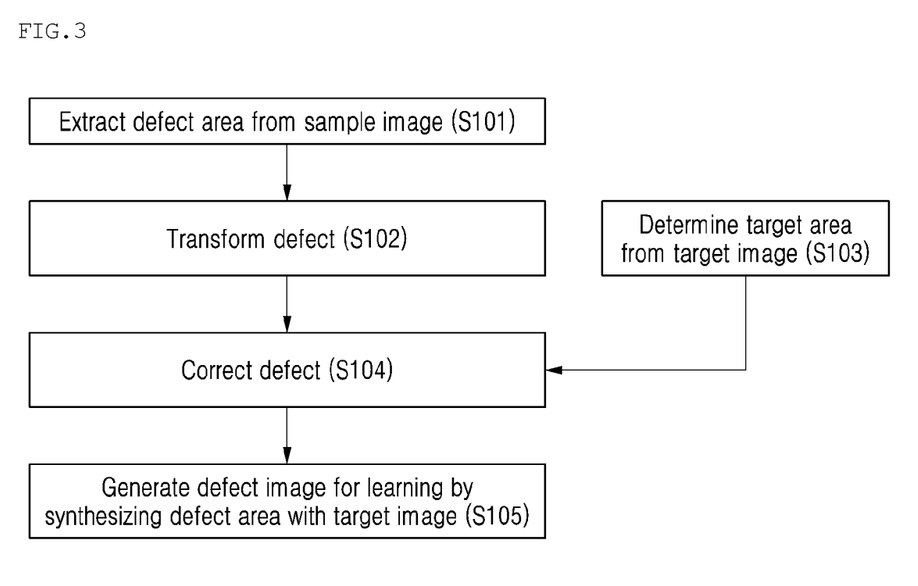
FIG. 3 is a flowchart for generating a defect image for training according to a first embodiment.

FIG. 3 is the flowchart for generating a defect image for training according to a first embodiment of the present disclosure. The method may be performed by a system having a central processing unit and a memory. Herein, the central processing unit may also be called a controller, a microcontroller, a microprocessor, or a microcomputer. In addition, the central processing unit may be implemented as hardware, firmware, software, or a combination thereof. When the central processing unit is implemented using hardware, the hardware may be configured to include an application specific integrated circuit (ASIC), a digital signal processor (DSP), a digital signal processing device (DSPD), a programmable logic device (PLD), or a field programmable gate array (FPGA). When the central processing unit is implemented using firmware or software, the firmware or software may be configured to include a module, procedure, or function for performing the above-described functions or operations. In addition, the memory may be realized as a read-only memory (ROM), a random-access memory (RAM), an erasable programmable read-only memory (EPROM), an electrically erasable programmable read-only memory (EEPROM), a flash memory, a static RAM (SRAM), a hard disk drive (HDD), or a solid state drive (SSD).

According to the first embodiment, the method of generating the defect image for training may include a process of extracting a defect, a process of transform the defect, a process of correcting a defect area including the defect, and a process of synthesizing the defect area with a base image. That is, the method may include a process of extracting any defect from a sample image, performing a transformation of the defect in various ways, and performing a synthesis of the transformed defect and the base image. Hereinafter, the method of generating the defect image for training according to the first embodiment will be described in more detail with reference to FIGS. 3 and 4.

The method of generating the defect image for training may begin with step S101 of extracting a defect area from a sample image. The sample image means an image acquired by photographing a product having a defect. The sample image may be acquired by photographing a product having a defect in a manufacturing process, an image acquired during a maintenance of a product, or an image acquired after intentionally making a defect on a product. In addition, according to the present disclosure, a large number of defect images with various shapes may be generated only from a sample image by generating multiple defect images.

The defect area may be categorized into two types. First, the defect area may be defined as an area including only a defect itself. That is, the inside of the closed curve formed by the outline of the defect is a defect area if a defect existed on a product. Herein, various analysis methods utilizing image data may be used to extract the defect area, such as boundary line extraction using differences in RGB (Red, Green, Blue) values or HSV (Hue, Saturation, Lightness) values between pixels constituting the image.

Second, the defect area may include an actual defect as well as a predetermined area surrounding the defect. That is, the defect and the surrounding area around the defect constitute a defect area. Herein, the defect area may be determined by a preset condition. For example, the condition may be set such that when the actual defect is identified, the defect area is the inside of the quadrangle defined by drawing horizontal and vertical lines on the outermost points of the top, bottom, left, and right of the defect.

Additionally, the defect area may be determined by a user input on the sample image. For example, on the system in which a sample image is loaded, a user designates an area surrounding any defect through a mouse input, a touch pen input, or a touch input to determine a defect area. Herein, the user defined defect area may include only the actual defect, or the surrounding area around the defect. As will be described later, the actual defect of the defect area is for generating a defect of a new shape, and the surrounding area is for generating a synthetic image free from unnatural feeling.

Figure 4:
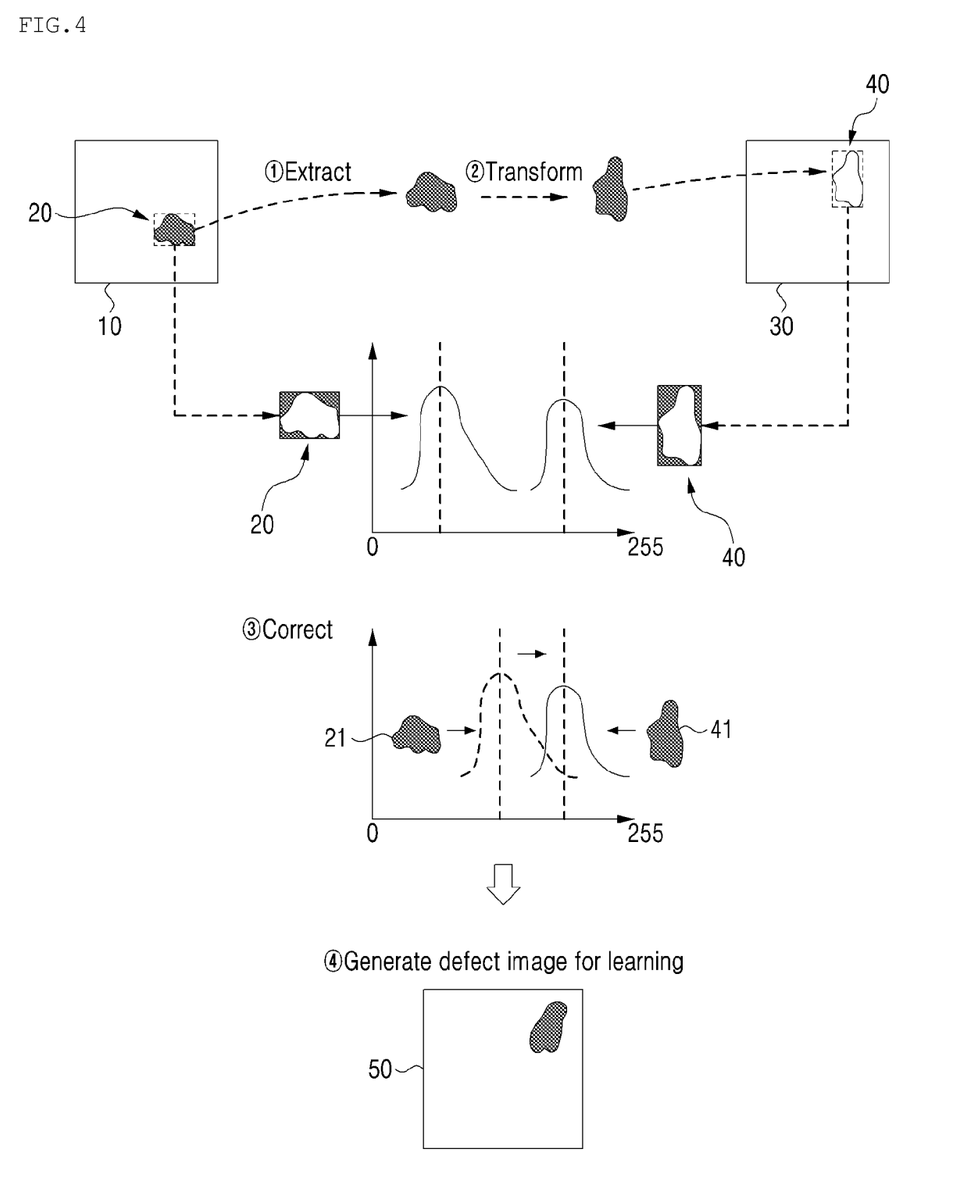
FIG. 4 is a diagram for better understanding of the method of generating the defect image for training according to the first embodiment.

Referring to FIG. 4, the upper left of the figure shows a process of extracting a defect area 20 from a sample image 10. A defect may exist at any position on the sample image 10. Any part of the sample image, as long as a defect is included, can be identified and extracted as a defect area 20. Herein, the defect area may include the inside of the closed curve of the defect, or may include both the defect itself and a predetermined surrounding area.

Referring to FIG. 3, after step S101, step S102 of transforming the defect may be executed. Step S102 is for generating defects in various shapes. Shape transformations, such as changing a size of a defect, transforming an outline shape of a defect, rotating a defect, or flipping a defect, may be performed to transform the defect shape. In each of the transformations, the degree of transformation is randomly determined to generate a large number of various types of defect shapes.

Step S102 may be an optional step in the method of generating the defect image for training, and performed only when necessary. If step S102 is omitted, a final defect image generated for training may be the same shape as the defect area 20 or the defect extracted from the sample image 10.

After step S102, step S103 of determining a target area in the base image may be executed. The base image may be understood as the background image of a final defect image, or an image that is synthesized with the defect extracted from the sample image. The target area may be understood as an area with which the defect area or defect extracted from the sample image is to be synthesized. Therefore, step S103 may be understood as a step of determining which position on the base image the defect area is to be synthesized with.

At step S103, a previously extracted defect area or defect may be referenced in the process of determining the target area. For example, the size, length, and width of the defect area, the shape, length, and width of the defect, or the shape, length, and width of the defect after performing transformation may be referenced in determining the target area. The target area may be determined to have the same size or shape as that of the defect area (or actual defect) to avoid an error in image synthesis due to the difference between the defect area (or actual defect) and the target area. For reference, at least one attribute between the position or the size of the target area in the base image may be determined randomly. That is, information acquired from the previously extracted defect area may be referenced in determining the target area, but either or both of the position and the size of the target area may be determined randomly.

Referring to FIG. 4, the upper right shows the process of determining the target area 40 in the base image 30. Herein, it is found that the defect area 20 or defect extracted from the sample image 10 is referenced for the target area 40.

After step S103, step S104 of correcting the defect area may be executed. Step S104 may be understood as a process of minimizing unnatural feeling from a synthetic image. If the defect area or defect extracted from the sample image was inserted to the base image as it is, the final output image might not look like a normal defect image, which results in loss of quality of the training data. The step of pre-correcting the defect area is provided to make a defect image as seamless as possible.

The two images on the center of FIG. 4 labeled as Correct show a process of correcting the defect area 20 by contrasting the defect area 20 with the target area 40. Among various correction methods, histogram correction may be an optimal choice. A histogram means a graph generated with variables, wherein an intensity value of an image is plotted on the horizontal axis and the number of pixels corresponding to the intensity level is plotted on the vertical axis. The graph allows to determine how bright or dark an image is. At step S104, the light and darkness of the defect area 20 may be corrected by measuring the number of pixels of each intensity values of the target area 40 in the base image 30. That is, a correction may be made to move the graph corresponding to the defect area 20 on the left in the histogram toward the graph corresponding to the target area 40.

It has been described above that a defect area may be defined in two types. The first is to include only a defect itself. The second is to include a defect and a surrounding area. The correction process at step S104 may be performed in both cases. In case of the first type, the color of the defect area is corrected to set histogram values similar to those of the target area. Herein, the degree of correction may be restricted to only allow the histogram of the defect close to the histogram of the target area 40, but not equal. It may be difficult to distinguish the defect area 20 if the histogram of the corrected image is same as the histogram of the target area 40. Therefore, in case of the first type, correction may be limited to a certain degree that would not make the histogram of the defect area equal to the histogram of the target area 40. In case of the second type, an additional correction of the surrounding area may be made. In some cases, a correction of the actual defect may be omitted and only a correction of the surrounding area may be made. Regarding the correction of the surrounding area of the defect, a histogram correction may be made similar to that of the target area. One way to minimize unnatural feeling from a synthetic image is to make the surroundings look seamless by correcting the surroundings of the area that the defect is being positioned. To this end, a histogram correction for reducing the difference between the surrounding area of the defect and the target area (or the surrounding area of the target area) may be made.

After step S104, step S105 of generating a defect image for training by synthesizing the corrected defect area with the target area in the base image may be executed. Step S105 may be understood as a step of adding the defect area created at the previous step to the base image. The step of generating the defect image for training may include an adjustment on the defect area to make the defect image more seamless. Various methods may be applied for the adjustment, including blur operation, interpolation operation, or harmonization operation on an edge of either or both of the defect and surrounding area of the defect.

The bottom of FIG. 4 shows the defect area that the transformed shape is synthesized with the target image which is a generated defect image 50.

The method of generating the defect image for training according to the first embodiment of the present disclosure has been described with reference to FIGS. 3 and 4.

Figure 5:
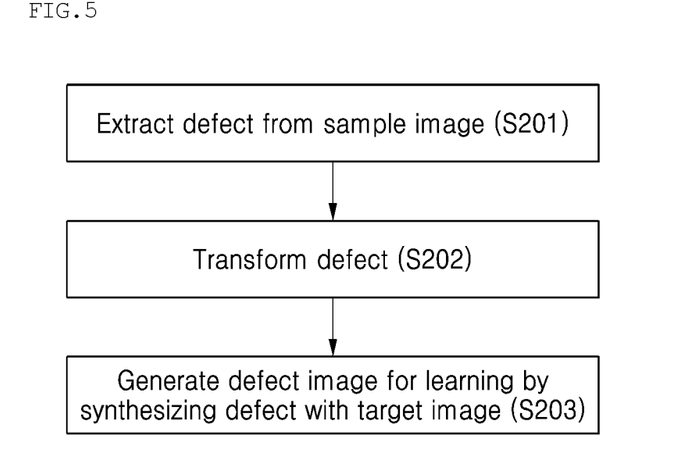
FIG. 5 is a flowchart for generating a defect image for training according to a second embodiment.
Figure 6:
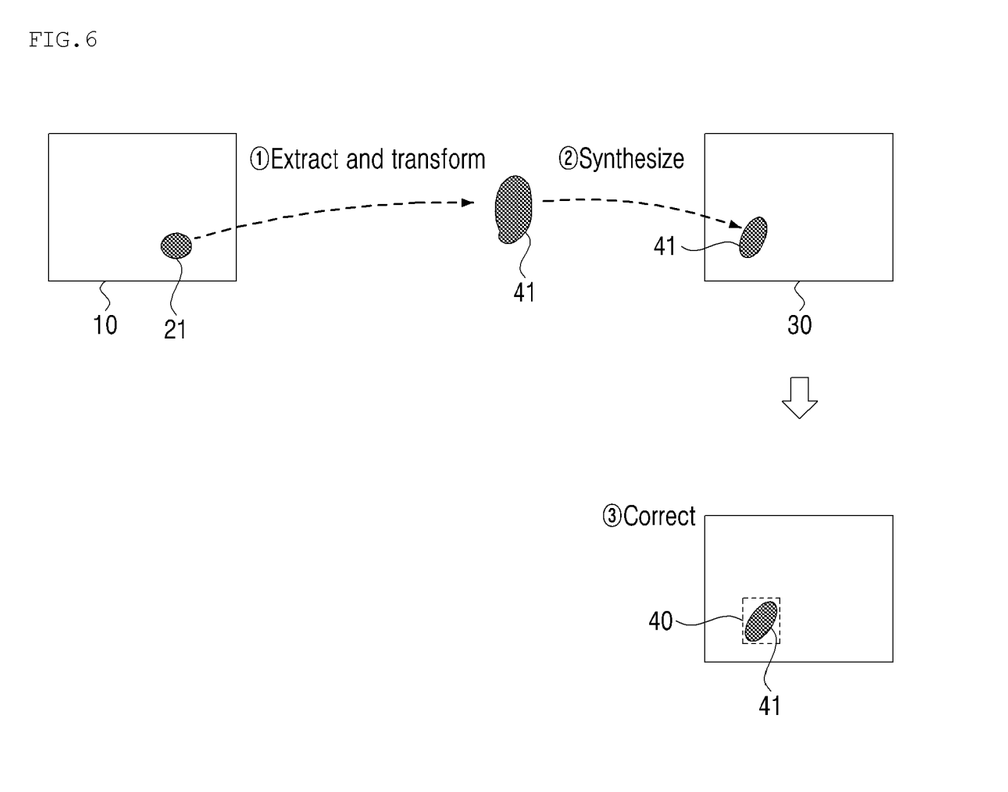
FIG. 6 is a diagram for better understanding of the method of generating the defect image for training according to the second embodiment.

FIGS. 5 and 6 are diagrams illustrating a method of generating a defect image for training according to a second embodiment of the present disclosure. Unlike the first embodiment, according to the second embodiment, a defect area is extracted from a sample image, the shape of the defect area is transformed, and the defect area is directly synthesized with a base image. That is, the process of correcting the defect area is omitted. Instead, the defect area is synthesized with the base image, and a correction follows to generate a defect image for training.

Referring to FIG. 5, the method of generating a defect image for training according to the second embodiment may begin with step S201 of extracting a defect area from a sample image. The notion of a sample image and defect area are same as those in the first embodiment except the defect area in the second embodiment only refers to a defect itself. That is, the defect area may be the inside of the closed curve formed by the outline of the defect.

After step S201, step S202 of transforming the shape of the defect may be executed. Step S202 is for generating defect images in various shapes by a shape transformation techniques including changing a size of a defect, transforming an outline shape of a defect, rotating a defect, or flipping a defect.

Immediately after step S202, step S203 of generating a defect image for training by synthesizing the transformed defect with the target image may be executed. At step S203, an image adjustment on the defect area may be further included after the transformed defect is inserted to the target area. The image adjustment is a process of making the training image data as seamless as possible. When performing the image adjustment, as described in the first embodiment, the following methods may be applied: blur operation, interpolation operation, or harmonization operation on an edge of the transformed defect area. The adjustment of an image may further include the surrounding area of the transformed defect area to reduce unnatural feeling caused by the synthesis. This process may be separately performed.

FIG. 6 shows the method of generating a defect image for training according to the second embodiment. The method generates an image in the following order: extracting a defect from a sample image 10 and transforming the defect 21; synthesizing the transformed defect 41 with the base image 30; and performing image adjustment on the target area 40 or transformed defect 41 in the base image.

The method of generating the defect image for training according to the second embodiment has been described with reference to FIGS. 5 and 6.

The first and the second embodiment described above are methods performed by a computing device having a central processing unit and a memory. A system in which each embodiment may be implemented will be described as follows with reference to FIGS. 7-8.

Figure 7:
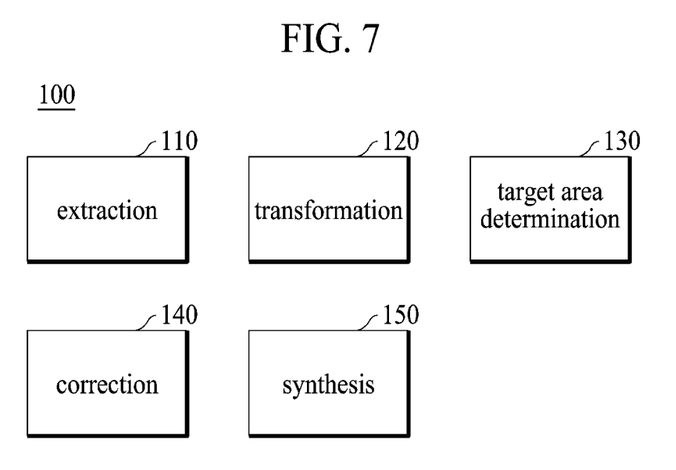
FIG. 7 is a diagram depicting a system corresponding to the first embodiment.

First, a system 100 corresponding to the first embodiment may include: an extraction component 110 extracting a defect area from a sample image; a target area determination component 130 determining a target area in a base image where the target area is an area with which the defect area is to be synthesized; a correction component 140 correcting the defect area by referring to image data of the target area; and a synthesis component 150 generating a defect image for training by synthesizing the defect area corrected by the correction component with the target area. In addition, the system 100 may further include a transformation component 120 for transforming a shape of a defect in the defect area.

Figure 8:
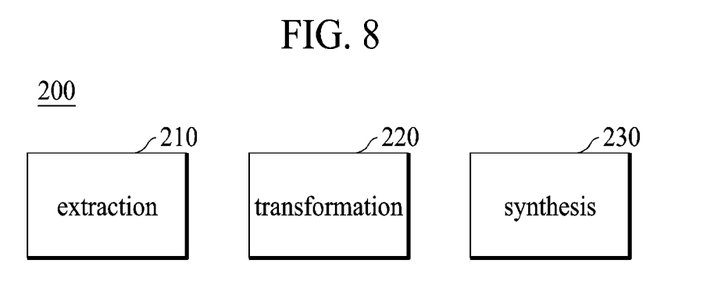
FIG. 8 is a diagram depicting another system corresponding to the second embodiment.

Second, a system 200 corresponding to the second embodiment may include: an extraction component 210 extracting a defect area from a sample image; a transformation component 220 transforming a shape of a defect in the defect area; and a synthesis component 230 generating a defect image for training by synthesizing the transformed defect with the base image.

A method of generating a defect image for training and a system therefor have been described. While exemplary embodiments have been described with reference to the accompanying drawings, it will be apparent to those skilled in the art that various modifications in form and details may be made therein without departing from the spirit and scope as defined in the appended claims. Therefore, the description of the exemplary embodiments should be construed in a descriptive sense and not to limit the scope of the claims, and many alternatives, modifications, and variations will be apparent to those skilled in the art.

What is claimed is:

1. A method of generating a defect image for training, by a system having a central processing unit and a memory, the method comprising:

extracting a defect area from a sample image, wherein the defect area comprises a first defect and a first surrounding area, wherein the first surrounding area forms a quadrangle encompassing the first defect, with border lines of the first surrounding area intersecting outermost top, bottom, left, and right points of the first defect;

determining a target area in a base image, the target area being an area with which the defect area is to be synthesized and comprising a second defect and a second surrounding area encompassing the second defect;

correcting the defect area by referring to image data of the target area, wherein the correcting of the defect area comprises a reduction of a histogram difference between the first surrounding area and the second surrounding area and between the first defect and the second defect, wherein the reduction of the histogram difference between the first defect and the second defect is restricted to a predefined degree while the reduction of the histogram difference between the first surrounding area and the second surrounding area is unrestricted; and generating the defect image for training by synthesizing the corrected defect area with the target area in the base image.

2. The method of claim 1, further comprising:
after the extracting of the defect area, transforming a shape of the defect area.

3. The method of claim 2, wherein the determining the target area in the base image comprises using the shape of the transformed defect area.

4. The method of claim 1, wherein the reducing of the histogram difference comprises reducing the histogram difference between the first surrounding area and the second surrounding area while maintaining the histogram difference between the first defect and the second defect unchanged.

5. The method of claim 4, wherein the reducing of the histogram difference does not make a histogram of the defect area equal to a histogram of the target area.

6. The method of claim 1, wherein the generating of the defect image for training by synthesizing the corrected defect area with the target area in the target image comprises performing an image adjustment on the defect area.

7. The method of claim 6, wherein the performing of the image adjustment comprises performing a blur operation on an edge of either or both of the first defect and the first surrounding area of the defect area.

8. A system for generating a defect image for training, wherein the system has a central processing unit and a memory, the system comprising:
an extraction module extracting a defect area from a sample image, wherein the defect area comprises a first defect and a first surrounding area, wherein the first surrounding area forms a quadrangle encompassing the first defect, with border lines of the first surrounding area intersecting outermost top, bottom, left, and right points of the first defect;

a target area determination module determining a target area in a base image, the target area being an area with which the defect area is to be synthesized and comprising a second defect and a second surrounding area encompassing the second defect;

a correction module correcting the defect area by referring to image data of the target area, wherein the correcting of the defect area comprises a reduction of a histogram difference between the first surrounding area and the second surrounding area and between the first defect and the second defect, wherein the reduction of the histogram difference between the first defect and the second defect is restricted to a predefined degree while the reduction of the histogram difference between the first surrounding area and the second surrounding area is unrestricted; and a synthesis module generating the defect image for training by synthesizing the corrected defect area with the target area in the base image.

9. The system of claim 8, further comprising:
a transformation module transforming a shape of the defect area.

10. The system of claim 9, wherein the target area determination module determines the target area using the shape of the transformed defect area.

11. The system of claim 8, wherein the reducing of the histogram difference comprises reducing the histogram difference between the first surrounding area and the second surrounding area while maintaining the histogram difference between the first defect and the second defect unchanged.

12. The system of claim 11, wherein the reducing of the histogram difference does not make a histogram of the defect area equal to a histogram of the target area.

13. The system of claim 8, wherein the synthesis module performs an image adjustment on the defect area by performing a blur operation on an edge of either or both the first defect or the first surrounding area of the defect area.

* * * * *